June 15, 1943.  M. R. HUTCHISON, JR  2,322,024
METHOD OF BURNISHING SCREW STICK HEADS
Filed June 21, 1941  2 Sheets-Sheet 1

MILLER R. HUTCHISON, JR.
INVENTOR

BY
ATTORNEYS

June 15, 1943.  M. R. HUTCHISON, JR  2,322,024
METHOD OF BURNISHING SCREW STICK HEADS
Filed June 21, 1941  2 Sheets—Sheet 2
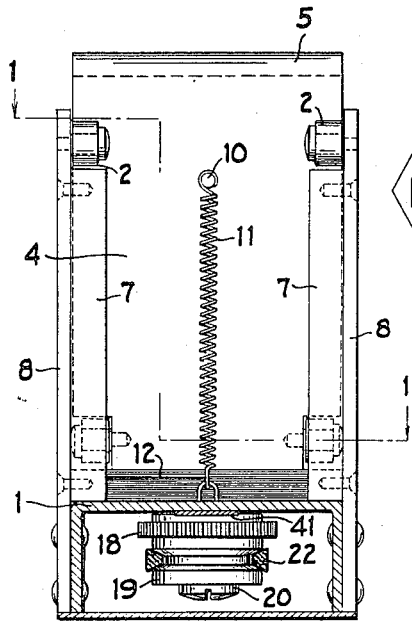
FIG. 4.
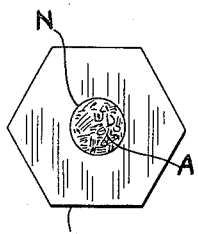
FIG. 9.
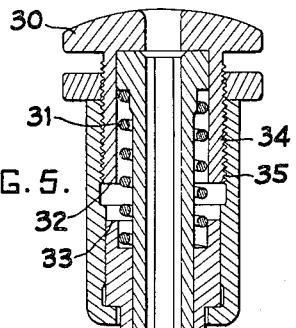
FIG. 5.
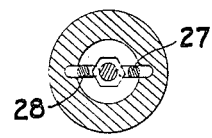
FIG. 6.
FIG. 8.
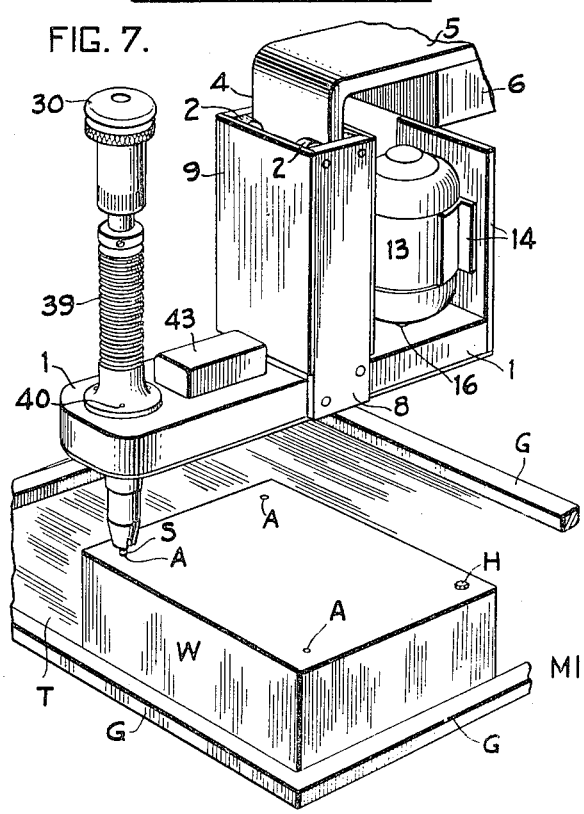
FIG. 7.
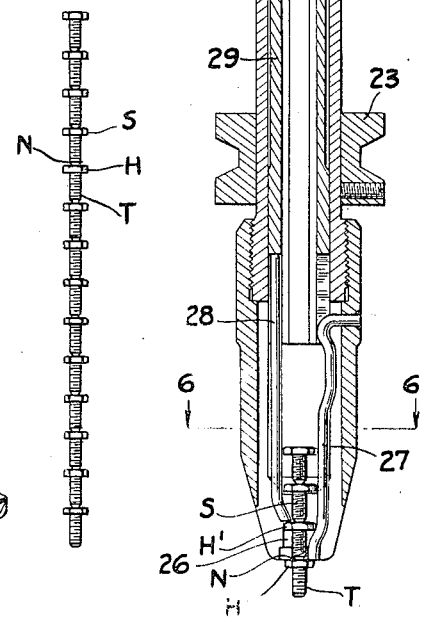
MILLER R. HUTCHISON, JR
INVENTOR
BY
ATTORNEYS Patented June 15, 1943

2,322,024

UNITED STATES PATENT OFFICE 2,322,024

METHOD OF BURNISHING SCREW STICK HEADS

Miller R. Hutchison, Jr., Rochester, N. Y., assignor to Eastman Kodak Company, Rochester, N. Y., a corporation of New Jersey Application June 21, 1941, Serial No. 399,119

5 Claims. (Cl. 144—32)

This invention relates to a method of burnishing a screw stick head in applying in screws of a screw stick to work. One object of my invention is to provide a method of rapidly burnishing a small area which may be rough, of a screw head which is applied to work by turning a stick of screws until a narrow neck between the threading end of one screw and the head of the next adjacent screw is ruptured. Still another object of my invention is to provide a method for smoothing the small roughened areas which may exist over that area of a screw stick which is fractured or twisted off in applying one screw to work through a torque applied to the next adjacent screw. Other objects will appear from the following specification, the novel features being particularly pointed out in the claims at the end thereof.

Coming now to the drawings wherein like reference characters denote like parts throughout:

Fig. 4 is a front elevation, parts being shown in section of a roller slide carrying the automatic screw driver support;

Fig. 5 is an enlarged sectional view through the screw driver for use in holding screw sticks in my machine;

Fig. 6 is a sectional view on line 6—6 of Fig. 5;

Fig. 7 is a fragmentary perspective view showing a portion of the screw driver in operative relationship with work; and Fig. 8 is a fragmentary side elevation of a screw stick for use in connection with my automatic screw driver.

Fig. 9 is an enlarged plan view showing a small area of a screw head which is slightly rough due to this area having been twisted off in applying the screw to work.

In my co-pending application, Serial No. 393,570, filed May 15, 1941, for Automatic screw driver I show and describe an automatic screw driver in which the screw driving mechanism is driven by an electric motor because this is a preferred way of carrying out my improved method of burnishing. However, other means may be employed.

This invention is particularly directed to the use of screw sticks in which a plurality of screws are integrally formed on rod stock, each screw consisting of a head, a threaded portion, and a narrow neck connecting the threaded portion of one screw to the head of the next adjacent screw. Such screw sticks are shown in my copending application Serial No. 306,504, filed November 28, 1939. This application has matured into Patent No. 2,247,499, granted July 1, 1941.

The screw driver is of a type especially designed to utilize such screw sticks and is substantially like the screw driver shown in my copending application Serial No. 305,505, filed November 28, 1939. This application has matured into Patent No. 2,247,500, granted July 1, 1941. In the present embodiment, instead of utilizing such a screw driver to drive screws by hand, the screw driver is automatically rotated.

As pointed out in my two above-mentioned applications, some of the advantages of utilizing a screw stick are that, since the neck between two integral screws is of a predetermined size and strength, a predetermined torque can be applied to drive the screws and this torque can be arranged to accurately seat each screw without the usual difficulties which occur in driving screws of the usual type, of setting certain screws too tightly, thus perhaps distorting the work or not tightening the screws sufficiently to hold the parts of the work together. By adding an automatic drive for turning the screws into the work it greatly reduces the labor of an operator in driving screws, it increases the output, and it produces a considerably better product, all screws will be uniformly seated in the work, and each screw will hold with the same tension as the driving conditions are always uniform.

As a preferred embodiment of my invention, I have shown an automatic screw driver mounted on a support which is vertically movable to bring screws into contact with work. It is obvious that the support carrying the automatic screw driver may be mounted in any desired manner or may be made portable in a similar manner to the standard types of portable drills which may be provided with a pistol grip type of handle. However, I have found the described embodiment of my invention an extremely useful one for bench work.

Figure 1:
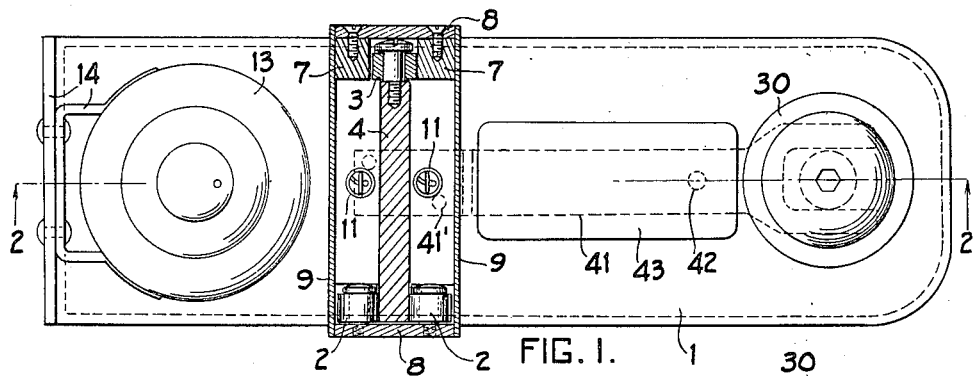
Fig. 1 is a top plan view of a typical automatic screw driving machine constructed in accordance with a preferred embodiment of my invention.
Figure 2:
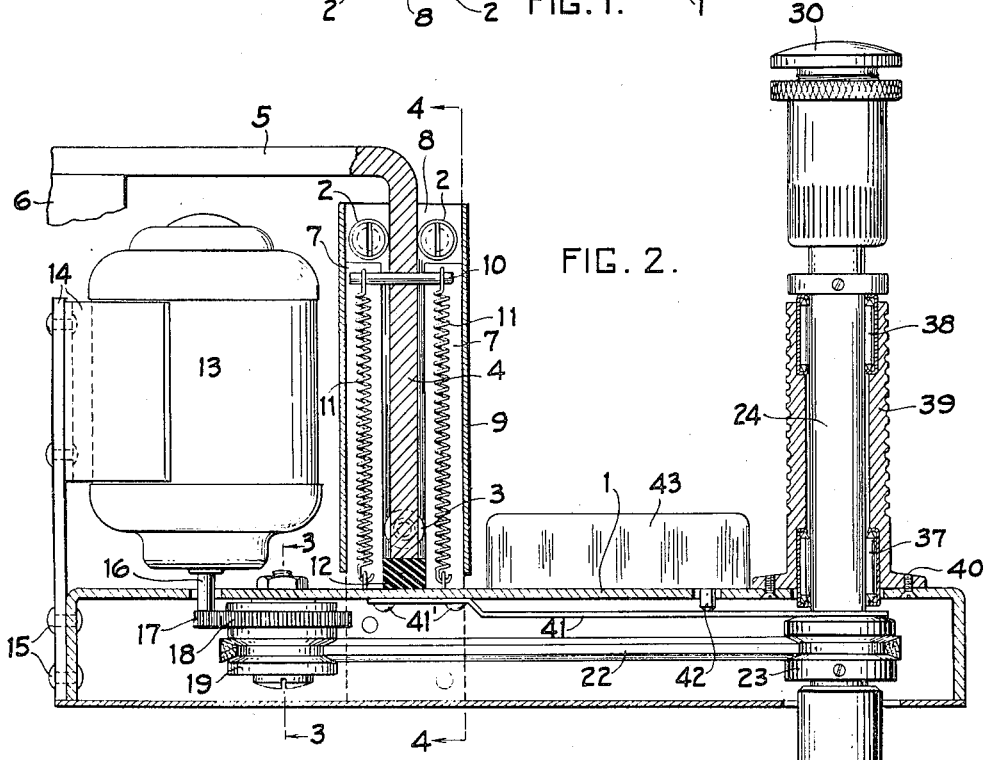
Fig. 2 is a section on line 2—2 of Fig. 1, some of the parts being shown in elevation.

Referring to Figs. 1 and 2, the screw driver may consist of a support 1 which may be mounted by means of a plurality of rollers 2 and 3 to move vertically with respect to a fixed track member 4 which may, in turn, include a bent arm 5 supported on a bench 6.

The roller 3 may be carried by the track 4 and may be adapted to engage the two spaced rails 7 carried by the support 1. The rollers 2 are preferably carried by an end wall 8 which forms a part of the housing 9, also carried by the support 1.

The track 4 carries a shaft 10 supporting one end of a pair of springs 11 attached at their lower ends to the support 1, these springs normally holding the support 1 in Fig. 2. Thus, the support 1 may be lowered a short distance—say ½"—to bring a screw into contact with work as will be hereinafter more fully described.

The support 1 carries a motor 13 on a bracket 14 attached to the support by rivets 15, and the motor shaft 16 carries a pinion 17 meshing with a gear 18 for rotating a pulley 19. This pulley is carried by the stud 20 on suitable roller bearings 21. A belt 22, here shown as a V-shaped belt, connects the pulley 19 to a pulley 23 which carries the screw driver 24 (best shown in Fig. 5).

This screw driver is substantially the same as the screw driver shown in my copending application. It consists of a hollow handle 25 for receiving screw sticks S, as shown in Fig. 8, the head of one screw being adjacent a narrow neck N of the next screw, and having a threaded portion T adjacent the head and extending to the neck. These screw sticks may be provided in any length, but in the present instance I find screw sticks of 25–30 screws a very convenient size to use. In the present instance, the screws are small ones the threads being .060", 90 threads per inch. The total length of the screws is approximately ⅛". This data is given merely to give a picture of the specific setup being described as, obviously, dimensions are otherwise unimportant and may be varied through extremely wide ranges. However, since small-sized screws are much more difficult to drive than large ones, because of the difficulty in handling, my automatic screw driver is particularly adapted for such work.

The screw sticks S are loaded into the hollow handle 25 of the screw driver and the head H of the lowermost screw extends below, or at least does not have driving contact with the formation 26 which closely fits the head of the next adjacent screw. Thus, when the screw driver 25 is rotated, the head H1 of the screw adjacent the head H of the lowermost screw is driven and the threaded portion T passes into the work until the head H is firmly seated therein, at which time the narrow neck N is twisted off.

When the screw has been seated in the work and the narrow neck N has been twisted off there sometimes remains a small area A as indicated in Fig. 9 which is slightly rough. There is also an area B as indicated in Fig. 5 on the end of the lowermost screw T which has previously been used for turning the screw into the work which is roughened. This area forming the other side of the fracture between the driving screw and the driven screw across the neck N.

The degree of roughness of the area A and B and the size of this area depends almost entirely on the size of the screw and the material of which the screw is made. Certain materials such as nickel silver and brass particularly in the small size screws may fracture so smoothly that the area A can scarcely be felt, and the break is so smooth that the reflection characteristics of the metal are only changed a little bit. However, if the fracture should prove to be rough enough to be objectionable I can easily eliminate it by my improved method. This method may be carried out by providing a momentary contact between the surfaces A and B after the screw being applied to work has been fully seated so that the screw which has been used for driving and the driven screw may rotate one against the other, this causing the slightly roughened areas A and B to polish or burnish each other smoothing out the roughtened areas A and B to such an extent that the fractured area can neither be seen nor felt.

Usually this operation takes so little time that it scarcely slows up the application of screws to work at all since it is only necessary for the operator to hold the rotating screw in momentary contact with the screw which has already been driven into work. It has been found in practice that this momentary contact is often obtained without the operator consciously endeavoring to prolong contact to cause the smoothing operation to take place. Since with the screw driver described herein the screw is rotating at a relatively high speed when the neck N is fractured it is difficult to tell the number of turns which are required for smoothing but slight practice on the part of the operator will enable him to satisfactorily eliminate all signs of fracture in the cases where this should be necessary. With small screws particularly only a few turns appear to be necessary to burnish the fracture and this takes place in a very small fraction of a second.

The lowermost screwhead N is held by means of a spring arm 27 against rearward movement into the screw driver handle. After driving the lowermost screw, the next screw is advanced to driving position by means of a screw advancing plunger 28 fastened to the sleeve 29 which may be moved downwardly by pressure upon the handle 30 at the top of the screw driver, thus depressing the advancing member against the pressure of a spring 31. This movement is limited to exactly the length of a screw by means of a shoulder 32 which can only move downwardly until it strikes a shoulder 33 carried by the outer sleeve of the screw driver 24, the relative position of these stops being adjustable by the mating threads 34 and 35.

The screw driver 24 is mounted in a pair of bearings 37 and 38 which are carried by a handle 39 attached by screws 40 to the base 1. This handle is used to move the screw driver into contact with work. The roller bearings 37 permit the screw driver to turn freely when the motor 13 is operated and, in addition, the roller bearings permit limited vertical movement of the screw driver in the fixed handle 39 for the following reasons. The screw driver 24 is carried by a leaf spring 41 encircling the screw driver and attached by rivets 41' to the support 1. The weight of the screw driver is sufficient to flex the spring 41 downwardly, but when an operator grips the handle 39 and lowers the lowermost screw S into contact with work W, the screw driver slides upwardly in the handle 39 a slight distance sufficient to flex the spring 41 toward the base 1 and operate the plunger 42 of a microswitch 43, thus making the circuit of the motor 13 which will then immediately and rapidly spin the screw S driving it into the work. The motor movement will continue until the screw S is seated, breaking off the neck N between this screw and the next adjacent screw. The springs 11 will then draw the support 1 upwardly and, as soon as pressure is relieved from the spring 41, the microswitch 43 will break the circuit of the motor and this motor will cease operating.

Figure 3:
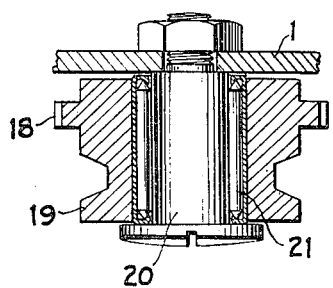
Fig. 3 is an enlarged detail section on line 3—3 of Fig. 2.
Figure 3A:
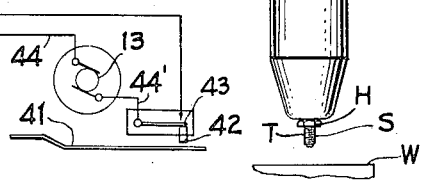
Fig. 3A is a wiring diagram.

From the wiring diagram in Fig. 3A, it will be noted that the motor 13 is connected through wires 44 and 44' to a source of power 45 and 46. The microswitch 43 with its operating plunger 42 is positioned make and break the circuit through upward movement of the spring arm 41 and I find it convenient to provide a switch 47 which can be manually opened when the automatic screw driver is not being used.

From the above description it will be seen that my automatic screw driver has a number of advantages, one of which is that a screw, which is not being turned, is first brought into contact with the work as an operator grips the handle 39 and moves the support carrying the screw driver to the desired position. Light downward movement on the handle 39 flexes the springs 11, permitting the support to slide downwardly on the track 4 and, as the screw S touches the work, the spring 41 is flexed making the circuit, rotating the screw driver, and rapidly seating the screw. If, as illustrated, the automatic screw driver is mounted on a bench, it will always accurately hold the axis of the screw in proper alignment with the tapped aperture in the work so that there will be no danger of "cross threading."

As illustrated in Fig. 7, the work W can be conveniently guided on a plane table T having a guide rail G around the edge, the position of the guide rail and work being such that, by sliding the work on the table, any one of a number of tapped apertures A can be brought into alignment with the tool. Of course, the design of the table where a permanently mounted automatic screw driver is used must conform to the particular work at hand. However, it has been found that with some care a setup can be provided which will permit an automatic screw driver to operate quite as rapidly as the fastest riveting machine on work of the same general nature.

If the automatic screw driver is not permanently mounted to move relative to a bench, but is of a portable type, an operator will have to use the same care which is always used with portable drills or other instruments to axially align screws with work.

While I have referred to the screw driver as driving screws into tapped openings and while, of course, it is particularly adapted for this purpose, it is to be understood that it can also be used for driving screws into openings designed to receive screws that are not threaded, such as known types of screw receiving members, such as "Tinnerman" nuts.

It is also to be understood that while I have described the preferred embodiment of my invention, it is obvious that the illustration shows only one preferred form of the broad idea shown herein of an automatic screw driver with which a screw, which is not turning, may be brought into contact with work, this contact automatically actuating a motor which will drive the screw into the work.

I have described a motor driven screw driver as the preferred embodiment of a machine suitable for carrying out my method of burnishing the fracture line or area which exists when one screw is turned into work by other screws of a screw stick breaking a narrow neck between screws. When I refer to screws herein I include threaded members with or without heads since obviously the ends of a stud which has been applied to work by twisting off a narrow neck can be burnished in the same manner as the head of a screw. Obviously the burnishing operation or smoothing operation can be carried out with any kind of a screw driver which will rotate a fractured neck of a screw stick against a fractured area of a threaded member applied to work. Another embodiment of a machine for carrying out the method described herein is my application for Automatic screw driver, Serial No. 399,472, filed June 24, 1941.

I, therefore, consider as within the scope of my invention all such forms as may come within the scope of the appended claims.

I claim:

1. A method of smoothing fracture areas formed in applying screws to work from a screw stick comprising a plurality of screws coaxially arranged and connected by narrow necks which comprises turning an end screw of a screw stick into work through a torque applied to another screw through said narrow neck until said narrow neck fractures and burnishing the fractured neck by continued rotative contact of the fractured neck with the seated screw.

2. A method of smoothing fracture areas formed in applying screws to work from a screw stick comprising a plurality of screws coaxially arranged and connected by narrow necks which comprises turning an end screw of a screw stick into work by rapidly rotating said screw stick to seat said end screw through a torque applied solely through said narrow neck until said neck ruptures and burnishing said rupture through momentary continued contact of the rapidly rotating screw stick with the ruptured work.

3. A method of smoothing fracture areas formed in applying screws to work from a screw stick comprising a plurality of screws coaxially arranged and connected by narrow necks which comprises turning an end screw of a screw stick into work solely through a torque applied to another screw through said narrow neck until the narrow neck fractures and momentarily continuing contact between the fractured areas of the screw driven into work and the screw which drove the screw into work so that the two fractured areas may quickly become smooth through movement of one fractured area against the other.

4. A method of smoothing roughened areas of threaded members in which an end threaded member of a stick of threaded members connected by narrow necks is applied to work by applying a torque to the end threaded member solely through the narrow neck until said neck is twisted off and continuing rotative movement of the stick with the fractured areas in contact until the roughened twisted off area is smoothed.

5. A method of smoothing roughened areas of threaded members in which an end threaded member of a stick of threaded members connected by narrow necks is applied to work by applying a torque to the end threaded member solely through the narrow neck until said neck is twisted off and continuing to rotate at high speed the stick of threaded members with the fracture area of the end threaded member in contact with the fracture area of the screw seated in work thus rapidly smoothing the fractured surfaces through the frictional contact thus formed.

MILLER R. HUTCHISON, Jr.